· # (12) United States Patent
Weydert et al.

(10) Patent No.: US 7,441,572 B2
(45) Date of Patent: Oct. 28, 2008

(54) PNEUMATIC TIRE HAVING A TREAD CONTAINING IMMISCIBLE RUBBER BLEND AND SILICA

(75) Inventors: Marc Weydert, Strassen (LU);
Christian Kaes, Schrondweiler (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 399 days.

(21) Appl. No.: 10/943,757

(22) Filed: Sep. 17, 2004

(65) Prior Publication Data

US 2006/0060285 A1    Mar. 23, 2006

(51) Int. Cl.
*B60C 11/00* (2006.01)
(52) U.S. Cl. .............. 152/209.1; 524/262; 524/526
(58) Field of Classification Search ............. 524/262, 524/502, 526; 152/209.1
See application file for complete search history.

(56) References Cited

U.S. PATENT DOCUMENTS

| | | | | |
|---|---|---|---|---|
| 4,515,922 A | 5/1985 | Sakakibara et al. | ............ | 525/99 |
| 4,742,124 A | 5/1988 | Tsutsumi et al. | ......... | 525/332.1 |
| 4,843,120 A | 6/1989 | Halasa et al. | ................. | 525/53 |
| 4,866,131 A | 9/1989 | Fujimaki et al. | .............. | 525/96 |
| 4,940,756 A | 7/1990 | Broekhuis et al. | ........... | 525/237 |
| 4,946,887 A | 8/1990 | Takino et al. | ................ | 524/495 |
| 5,036,138 A | 7/1991 | Stamhuis et al. | .............. | 525/99 |
| 5,047,483 A | 9/1991 | Halasa et al. | ................ | 525/237 |
| 5,061,765 A | 10/1991 | Hsu et al. | ................... | 526/141 |
| 5,137,998 A | 8/1992 | Hsu et al. | ................... | 526/174 |
| 5,164,450 A | 11/1992 | Tsutsumi et al. | ............ | 525/192 |
| 5,194,485 A | 3/1993 | Kikkuchi et al. | ............ | 524/526 |
| 5,227,425 A | 7/1993 | Rauline | ...................... | 524/493 |
| 5,239,009 A | 8/1993 | Halasa et al. | ............... | 525/258 |
| 5,272,220 A | 12/1993 | Rodgers et al. | .......... | 525/332.3 |
| 5,405,927 A | 4/1995 | Hsu et al. | ................... | 526/337 |
| 5,409,988 A | 4/1995 | Kikuchi | ....................... | 524/526 |
| 5,504,135 A | 4/1996 | Ardrizzi et al. | ............. | 524/484 |
| 5,620,939 A | 4/1997 | Halasa et al. | ............... | 502/152 |
| 5,627,237 A | 5/1997 | Halasa et al. | ............... | 525/236 |
| 5,654,384 A | 8/1997 | Halasa et al. | ............... | 526/174 |
| 5,677,402 A | 10/1997 | Halasa et al. | ............... | 526/174 |
| 5,723,530 A | 3/1998 | Zanzig et al. | ............... | 524/495 |
| 5,834,552 A | 11/1998 | Kawazura et al. | ........... | 524/526 |
| 5,965,661 A | 10/1999 | Du Bois et al. | .......... | 524/575.5 |
| 6,103,808 A | 8/2000 | Hashimoto | ................... | 524/484 |
| 6,103,842 A | 8/2000 | Halasa et al. | ............... | 526/175 |
| 6,146,520 A | 11/2000 | Gupte et al. | ................. | 208/322 |
| 6,248,929 B1 | 6/2001 | Kaimai et al. | ............... | 585/241 |
| 6,399,697 B1 | 6/2002 | Takasaki et al. | ............. | 524/575 |
| 6,407,153 B1 | 6/2002 | Von Hellens | ................ | 524/188 |
| 6,410,816 B2 | 6/2002 | Takasaki et al. | ............. | 585/833 |
| 6,465,560 B1 | 10/2002 | Zanzig et al. | ............... | 524/495 |
| 6,559,240 B2 | 5/2003 | Hsu et al. | ................. | 525/332.8 |
| 6,608,125 B2 | 8/2003 | Cruse et al. | .................. | 524/262 |
| 2001/0007049 A1 | 7/2001 | Takasaki et al. | ............. | 585/833 |
| 2002/0000280 A1 | 1/2002 | Scholl | ......................... | 152/519 |
| 2002/0045697 A1 | 4/2002 | Sohnen et al. | .............. | 524/492 |
| 2002/0055568 A1 | 5/2002 | Cruse et al. | .................. | 524/262 |
| 2003/0130535 A1 | 7/2003 | Deschler et al. | ............. | 556/413 |
| 2005/0096424 A1 | 5/2005 | Hideki et al. | ............... | 524/496 |

FOREIGN PATENT DOCUMENTS

| | | |
|---|---|---|
| EP | 1493596 | 5/2005 |
| EP | 1493597 | 5/2005 |
| ES | 2 122 917 | 12/1998 |

OTHER PUBLICATIONS

Document View of JP2002097369 (full application not available for print).
Internet Article "Dow Synthetic Rubber Markets & Applications Tires." Published Oct. 14, 2005.
European Search Report.

*Primary Examiner*—Peter D Mulcahy
(74) *Attorney, Agent, or Firm*—John D. DeLong

(57) ABSTRACT

The invention is directed to a pneumatic tire having a tread comprising a vulcanizable rubber composition comprising, expressed as parts by weight per 100 parts by weight of elastomer (phr), (A) 60 to 95 phr of solution-polymerized styrene-butadiene rubber with a bound styrene content of from 35 to 45 percent by weight, a vinyl 1,2 content of from 15 to 30 percent by weight based on the butadiene content, and a Tg of from about −40° C. to about −20° C.;

(B) 5 to 40 phr of cis-1,4 polybutadiene having a Tg of from −95° C. to −105° C.

(C) 50 to 150 phr of silica;

(D) 30 to 70 phr of processing oil; and (E) 0.5 to 20 phr of a sulfur containing organosilicon compound.

14 Claims, 1 Drawing Sheet

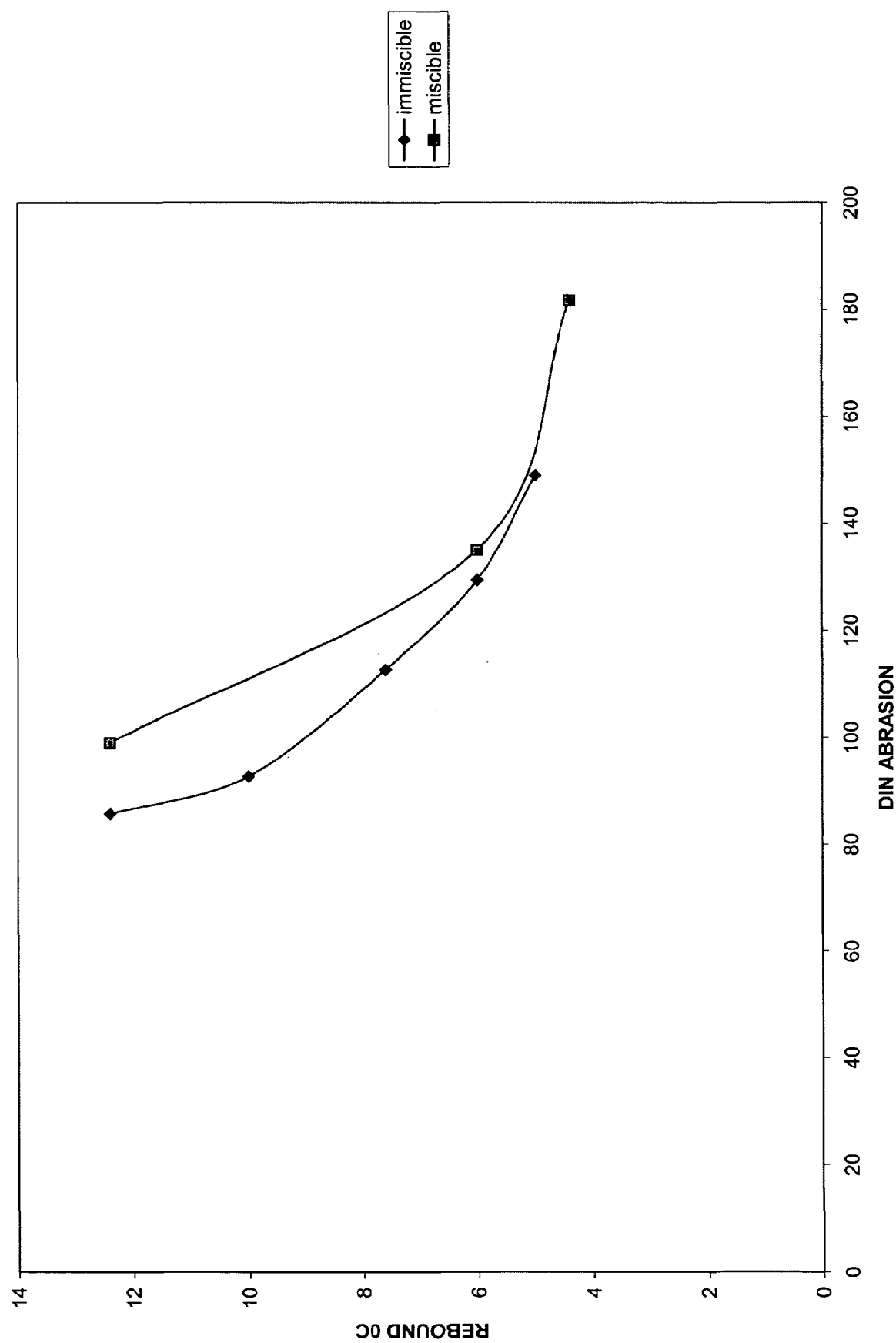

PNEUMATIC TIRE HAVING A TREAD CONTAINING IMMISCIBLE RUBBER BLEND AND SILICA

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubbery material for automobile tire treads.

SUMMARY OF THE INVENTION

The present invention is directed to a pneumatic tire having a tread comprising a vulcanizable rubber composition comprising, expressed as parts by weight per 100 parts by weight of elastomer (phr), (A) 60 to 95 phr of solution-polymerized styrene-butadiene rubber with a bound styrene content of from 35 to 45 percent by weight, a vinyl 1,2 content of from 15 to 30 percent by weight based on the butadiene content, and a Tg of from about −40° C. to about −20° C.;

(B) 5 to 40 phr of cis-1,4 polybutadiene having a Tg of from −95° C. to −105° C.;

(C) 50 to 150 phr of silica;

(D) 30 to 70 phr of processing oil; and (E) 0.5 to 20 phr of a sulfur containing organosilicon compound.

DESCRIPTION OF THE INVENTION

The invention is directed to a pneumatic tire having a tread comprising a vulcanizable rubber composition comprising, expressed as parts by weight per 100 parts by weight of elastomer (phr), (A) 60 to 95 phr of solution-polymerized styrene-butadiene rubber with a bound styrene content of from 35 to 45 percent by weight, a vinyl 1,2 content of from 15 to 30 percent by weight based on the butadiene content, and a Tg of from about −40° C. to about −20° C.;

(B) 5 to 40 phr of cis-1,4 polybutadiene having a Tg of from −95° C. to −105° C.;

(C) 50to 150 phr of silica;

(D) 30 to 70 phr of processing oil; and (E) 0.5 to 20 phr of a sulfur containing organosilicon compound.

One component of the rubber composition is from about 60 to about 95 phr of a solution polymerized styrene-butadiene rubber (SSBR) with a styrene content of from about 35 to about 45 percent by weight, a 1,2-vinyl content of about 15 to about 30 percent by weight, based on the butadiene portion of the copolymer, and a Tg of from about −20° C. to about −40° C. Suitable solution polymerized styrene-butadiene rubbers may be made, for example, by organo lithium catalyzation in the presence of an organic hydrocarbon solvent. The polymerizations employed in making the rubbery polymers are typically initiated by adding an organolithium initiator to an organic polymerization medium that contains the monomers. Such polymerizations are typically carried out utilizing continuous polymerization techniques. In such continuous polymerizations, monomers and initiator are continuously added to the organic polymerization medium with the rubbery polymer synthesized being continuously withdrawn. Such continuous polymerizations are typically conducted in a multiple reactor system. Suitable polymerization methods are known in the art, for example as disclosed in U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240.

Suitable solution polymerized styrene-butadiene rubbers are available commercially, such as Dow SLR 6410, Nippon Zeon NS 420, and the like. Such solution polymerized styrene-butadiene rubber may be tin- or silicon-coupled, as is known in the art. In one embodiment, suitable SSBR may be at least partially silicon-coupled.

Another component of the rubber composition is from about 10 to about 90 phr of polybutadiene. Suitable polybutadiene rubbers may be prepared, for example, by organic solution polymerization of 1,3-butadiene. The BR may be conveniently characterized, for example, by having at least a 90 percent cis 1,4-content and a glass transition temperature Tg in a range of from −95 to −105° C. Suitable polybutadiene rubbers are available commercially, such as Budene® 1207 from Goodyear and the like.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute.

In one aspect, the use of suitable SSBR and suitable polybutadiene of the specified composition may result in a rubber composition having at least two elastomer phases.

More specifically, between 5 and 40 weight percent of the elastomers may have a Tg lower than −95° C., namely the cis 1,4-polybutadiene, and between 60 and 95 percent by weight of the elastomers may have a Tg of higher than −40° C., namely the styrene-butadiene copolymer.

In this manner, it is considered herein that the relatively low Tg cis 1,4-polybutadiene elastomer is relatively incompatible with the high Tg styrene-butadiene copolymer elastomer as evidenced by their individual Tan delta peaks on a graphical presentation, or plot, of Tan delta versus temperature cured of the rubber composition within a temperature range of about −120° C. to about 10° C.

Accordingly, the elastomers of the rubber composition may be present in at least two phases, comprised of a cis 1,4 polybutadiene phase and an additional phase comprised of said styrene/butadiene and/or tin- or silicon- coupled styrene-butadiene phase.

In particular, a graphical plot of Tan delta versus temperature curve within a broad range of −100° C. to 10° C. for the rubber composition of this invention may yield two peaks in the curve with one peak having its apex within a relatively low temperature range of −110° C. to −70° C. and a second peak with its apex within a higher temperature range of −35° C. to +10° C.

Thus, one indication of the elastomer incompatibilities is the presence of the dual Tan delta peaks for the sulfur cured elastomer composition. The Tan delta values, with the included peaks in their curves, can be determined by dynamic mechanical testing of the cured compound by procedures well known to those skilled in such art.

Thus, the cured compounded rubber composition may exhibit at least two Tan delta peaks within the aforesaid temperature range. For the cured compounded rubber, it is considered herein that a combination of the Tan delta peak, at the lower temperature (e.g. −100° C. to −50° C.) for the low Tg elastomer (e.g. cis 1,4-polybutadiene), may suggest a promotion of improved resistance to abrasion property (i.e. improved treadwear for a tire) together with the second Tan delta peak, at the higher temperature (e.g. −30° C. to 10° C.) represented by the high Tg elastomer (e.g. the SBR), may suggest a promotion of higher hysteresis at temperatures within a range of about −30° C. to about 0° C. (i.e. higher tire tread traction), all of which is predictive of a better balance of such abrasion resistance and traction properties, particularly for a tire tread, than a cured rubber composition exhibiting only a single Tan delta peak within the aforesaid temperature range of −90° C. to 10° C.

The rubber composition may optionally include from 0 to about 20 phr of 3,4-polyisoprene rubber. The 3,4-polyisoprene rubber (3,4-PI) is considered beneficial for the purpose of enhancing the tire's traction when it is used in a tire tread composition. The 3,4-PI is more fully described in U.S. Pat. No. 5,087,668 which is incorporated herein by reference.

The rubber composition may also include from 30 to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, napthenic, and low PCA oils, such as MES, TDAE, and heavy naphthenic oils.

In one embodiment, the rubber composition includes a low PCA oil. Suitable low PCA oils include but are not limited to mild extraction solvates (MES), treated distillate aromatic extracts (TDAE), and heavy napthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy napthenic oils generally have a Tg in a range of from about −42° C. to about −48° C.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard* 2000 *Parts*, 2003, 62nd edition, published by the Institute of Petroleum, United Kingdom.

In one embodiment, the low PCA oils may be an MES, TDAE or heavy napthenic types having characteristics as identified in the following table.

| | MES | TDAE | Heavy Naphthenic |
|---|---|---|---|
| Aromatics % (2140) | 11-17 | 25-30 | 11-17 |
| Spec. Gravity @ 15° C. [kg/l] | 0.895-0.925 | 0.930-0.960 | 0.920-0.950 |
| Visc. 40° C. (cSt) | 150-230 | 370-430 | 350-820 |
| Visc. 100° C. (cSt) | 13-17 | 16-22 | 17-33 |
| Visc. Gravity Const. | 0.825-0.865 | 0.860-0.890 | 0.840-0.870 |
| Refractive Index | 1.495-1.510 | 1.520-1.540 | 1.500-1.520 |
| Tg [° C.]/inflection | −60 ± 3 | −47 ± 3 | −45 ± 3 |
| Aniline Point [° C.] | 85-100 | | |
| Pour Point [° C.] | 0 max | 30 max | 0 max |
| DMSO [%, IP 346] | <2.9 | <2.9 | <2.9 |
| Flashpoint [° C.] | >220 | >240 | >240 |

In one embodiment, the low PCA oils may be an MES type that is a complex combination of hydrocarbons predominantly comprised of saturated hydrocarbons in the range of $C_{20}$ to $C_{50}$ obtained by (1) solvent extraction of heavy petroleum distillate; or (2) treating of heavy petroleum distillate with hydrogen in the presence of a catalyst; followed by solvent dewaxing. In one embodiment, the low PCA oil contains not more than 1 mg/kg of benzo(a)pyrene, and not more than 10 mg/kg total of the following polycyclic aromatic hydrocarbons: benzo(a)pyrene, benzo(e)pyrene, benzo(a)anthracene, benzo(b)fluoranthene, benzo(j)fluoranthene, benzo(k)fluoranthene, dibenzo(a,h)anthracene, and chrysene.

Suitable MES oils are available commercially as Catenex SNR from Shell, Prorex 15 and Flexon 683 from ExxonMobil, VivaTec 200 from BP, Plaxolene MS from TotalFinaElf, Tudalen 4160/4225 from Dahleke, MES-H from Repsol, MES from Z8, and Olio MES S201 from Agip. Suitable TDAE oils are available as Tyrex 20 from ExxonMobil, VivaTec 500, VivaTec 180 and Enerthene 1849 from BP, and Extensoil 1996 from Repsol. Suitable heavy naphthenic oils are available as Shellflex 794, Ergon Black Oil C1, Ergon Black Oil C2, Ergon H2000, Cross C2000, Cross C2400, and San Joaquin 2000L. The oils may be available as the oil alone or along with an elastomer in the form of an extended elastomer.

The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials, and such terms are well known to those having skill in the rubber mixing or rubber compounding art.

The vulcanizable rubber composition may include from about 50 to about 150 phr of silica.

The commonly employed siliceous pigments which may be used in the rubber compound include conventional pyrogenic and precipitated siliceous pigments (silica). In one embodiment, precipitated silica is used. The conventional siliceous pigments employed in this invention are precipitated silicas such as, for example, those obtained by the acidification of a soluble silicate, e.g., sodium silicate.

Such conventional silicas might be characterized, for example, by having a BET surface area, as measured using nitrogen gas. In one embodiment, the BET surface area may be in the range of about 40 to about 600 square meters per gram. In another embodiment, the BET surface area may be in a range of about 50 to about 300 square meters per gram. The BET method of measuring surface area is described in the *Journal of the American Chemical Society*, Volume 60, Page 304 (1930).

The conventional silica may also be characterized by having a dibutylphthalate (DBP) absorption value in a range of about 100 to about 400, alternatively about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

The vulcanizable rubber composition may include from 1 to 30 phr of carbon black, crosslinked particulate polymer gel, ultra high molecular weight polyethylene (UHMWPE) or plasticized starch.

Commonly employed carbon blacks can be used as a conventional filler. Representative examples of such carbon blacks include N110, N121, N134, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels including but not limited to those disclosed in U.S. Pat. Nos. 6,242,534; 6,207,757; 6,133,364; 6,372,857; 5,395,891; or 6,127,488, and plasticized starch composite filler including but not limited to that disclosed in U.S. Pat. No. 5,672,639.

In one embodiment the rubber composition for use in the tire tread may contain a conventional sulfur containing organosilicon compound. Examples of suitable sulfur containing organosilicon compounds are of the formula:

Z-Alk-S$_n$-Alk-Z in which Z is selected from the group consisting of

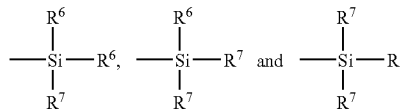

where R$^6$ is an alkyl group of 1 to 4 carbon atoms, cyclohexyl or phenyl; R$^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis (trimethoxysilylpropyl) trisulfide, 3,3'-bis (triethoxysilylpropyl) trisulfide, 3,3'-bis (tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis (trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

In one embodiment, the sulfur containing organosilicon compounds are the 3,3'-bis(trimethoxy or triethoxy silylpropyl) sulfides. In one embodiment, the sulfur containing organosilicon compounds are 3,3'-bis(triethoxysilylpropyl) disulfide and 3,3'-bis(triethoxysilylpropyl) tetrasulfide. Therefore, as to formula I, Z may be

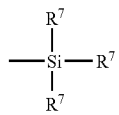

where R$^7$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. As disclosed in U.S. Pat. No. 6,608,125, these sulfur containing organosilicon compounds are of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms. In one embodiment, the sulfur containing organosilicon compounds includes 3-(octanoylthio)-1-propyltriethoxysilane, $CH_3(CH_2)_6C(=O)—S—CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication 2003/0130535. As disclosed in U.S. Patent Publication 2003/0130535, these sulfur containing organosilicon compounds are of the formulas II or III

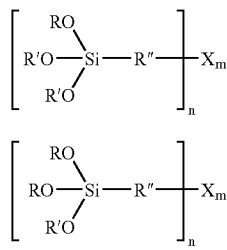

wherein: R is a methyl or ethyl group;

R' is identical or different and is a $C_9C_{30}$ branched or unbranched monovalent alkyl or alkenyl group, aryl group, aralkyl group, branched or unbranched $C_2$-$C_{30}$ alkyl ether group, branched or unbranched $C_2$-$C_{30}$ alkyl polyether group or R'''$_3$Si, where R''' is $C_1$-$C_{30}$ branched or unbranched alkyl or alkenyl group, aralkyl group or aryl group, R'' is a branched or unbranched, saturated or unsaturated, aliphatic, aromatic or mixed aliphatic/aromatic divalent $C_1$-$C_{30}$ hydrocarbon group;

X is SH where n=1 and m=1, S where n=2 and m=1-10 and mixtures thereof, S(C=O)—R''' where n=1 and m=1 or H where n=1 and m=1;

R'' may mean $CH_2$, $CH_2CH_2$, $CH_2CH_2CH_2$, $CH_2CH_2CH_2CH_2$, $CH(CH_3)$, $CH_2CH(CH_3)$, $C(CH_3)_2$, $CH(C_2H_5)$, $CH_2CH_2CH(CH_3)$, $CH_2CH(CH_3)CH_2$ or

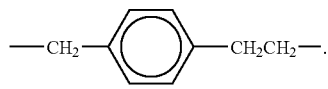

In one embodiment, the sulfur containing organosilicon compound is of formula II, R is ethyl, R' is $C_{12}$—$C_{14}$ alkyl, R'' is $CH_2CH_2CH_2$, X is SH, n is 1 and m is 1. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of tackifier resins, if used, comprise about 0.5 to about 10 phr, usually about 1 to about 5 phr. Typical amounts of processing aids comprise about 1 to about 50 phr. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the compound is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

The following examples are presented for the purposes of illustrating and not limiting the present invention. All parts are parts by weight unless specifically identified otherwise.

EXAMPLE I

In this example, eight rubber compounds are compared. Samples 1 and 2 represent control samples typical of the prior art. Sample 3 is representative of the present invention.

TABLE 1

Base Compound Recipe

First Non-Productive Mix Step

| | |
|---|---|
| Elastomers[1] | 100 |
| Oil[2] | 50 |
| Silica[3] | 95 |
| Coupling agent[4] | 15.2 |
| Waxes[5] | 1.5 |
| Stearic acid | 2.5 |
| Antidegradant[6] | 0.75 |

Second Non-Productive Mix Step

| | |
|---|---|
| Antidegradant[6] | 1.75 |

Productive Mix Step

| | |
|---|---|
| Antidegradant[6] | 1 |
| Zinc oxide | 3.5 |
| Sulfur | 1.4 |
| Accelerators[7] | 5.5 |
| Coupling agent[8] | 2 |

[1]From Table 2
[2]Including elastomer extender oils as defined in Table 2 and added process oil
[3]Z1165MP from Rhodia
[4]50 percent bis(triethoxypropylsilyl) disulfide on carbon black
[5]Microcrystalline and paraffinic
[6]P-phenylenediamine type
[7]Sulfenamide and guanidine type
[8]50 percent bis(triethoxypropylsilyl) tetrasulfide on carbon black

TABLE 2

Elastomers and Physical Properties of Vulcanizates

| Sample | 1 | 2 | 3 | 4 | control 5 | control 6 | control 7 | control 8 |
|---|---|---|---|---|---|---|---|---|
| Polybutadiene[9] | 40 | 30 | 20 | 10 | 0 | 0 | 20 | 40 |
| SSBR, high styrene[10] | 60 | 70 | 80 | 90 | 100 | 0 | 0 | 0 |
| SSBR, med styrene[11] | 0 | 0 | 0 | 0 | 0 | 100 | 80 | 60 |
| Physical Properties | | | | | | | | |
| Shore A | 66.9 | 66.3 | 66.2 | 66.2 | 66.8 | 60.7 | 63.5 | 62.5 |
| Rebound 0° C. | 12.4 | 10 | 7.6 | 6 | 5 | 4.4 | 6 | 12.4 |
| Rebound 23° C. | 31.6 | 28.4 | 25.8 | 23.6 | 19.4 | 13.4 | 23 | 33 |
| Rebound 100° C. | 62.4 | 61.6 | 61.4 | 62.8 | 61.8 | 60.4 | 61.2 | 62.8 |
| Elongation, % | 436 | 469 | 417 | 458 | 440 | 389 | 385 | 392 |
| True Tensile, MPa | 93.3 | 109 | 89.3 | 104.4 | 104.1 | 81.7 | 76.5 | 76.4 |
| Modulus @ 100% | 2.38 | 2.36 | 2.41 | 2.39 | 2.6 | 2.22 | 2.16 | 2.1 |
| Modulus @ 200% | 6.35 | 6.46 | 6.69 | 6.65 | 7.35 | 6.87 | 6.31 | 5.96 |
| Modulus @ 300% | 12.1 | 12.2 | 12.7 | 12.4 | 13.6 | 13.3 | 12.5 | 12 |
| Tensile Strength, MPa | 29.5 | 35.4 | 27.7 | 34.1 | 33.9 | 24.1 | 22.2 | 22 |
| Drum Abrasion (mm$^3$) | 86 | 93 | 113 | 129 | 149 | 182 | 135 | 99 |

[9]Budene ® 1207, from The Goodyear Tire & Rubber Company
[10]SE SLR 6410, partially silicon-coupled, solution-polymerized styrene butadiene rubber extended with 50 phr aromatic oil, typical properties reported as 40 percent by weight of styrene and 25 percent by weight vinyl (of butadiene segments), Tg = −32.9° C., Mooney ML 1 + 4 (100° C.) = 65.0, from the Dow Chemical Company
[11]SE SLR 4610, partially silicon-coupled, solution-polymerized styrene butadiene rubber extended with 37.5 phr aromatic oil, typical properties reported as 25 percent by weight of styrene and 63 percent by weight vinyl (of butadiene segments), Tg = −25.2° C., Mooney ML 1 + 4 (100° C.) = 45.0, from the Dow Chemical Company.

The elastomers were compounded in a three-stage mix procedure with standard amounts of conventional curatives and processing aids as indicated in Table 1, and cured with a standard cure cycle. Cured samples were evaluated for various physical properties following standard tests protocols as indicated in Table 2.

As can be seen from Table 3, samples 1 through 4 representative of the present invention, show an improved balance between wet grip and wear as compared with the control samples 5 through 8. The Figure illustrates the improved balance of wet grip vs. wear balance. As seen in the Figure, samples 1 through 5 with the immiscible blend of polybutadiene and SSBR show a lower wear for a given wet grip as compared with the miscible blend of polybutadiene and SSBR (samples 6 through 8).

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having a tread comprising a vulcanizable rubber composition comprising, expressed as parts by weight per 100 parts by weight of elastomer (phr),
    (A) 60 to 70 phr of solution-polymerized styrene-butadiene rubber with a bound styrene content of from 38 to 42 percent by weight, a vinyl 1,2 content of from 20 to 25 percent by weight based on the butadiene content, and a Tg of from about −40° C. to about −20° C.;
    (B) 30 to 40 phr of cis-1,4 polybutadiene having a Tg of from −95° C. to −105° C.;
    (C) 50 to 150 phr of silica;
    (D) 30 to 70 phr of processing oil; and
    (E) 0.5 to 20 phr of a sulfur containing organosilicon compound.
    wherein the cis-1,4 polybutadiene and the solution-polymerized styrene-butadiene rubber are an immiscible blend, and wherein the rubber composition shows a lower wear as measured by DIN abrasion than for an otherwise identical rubber composition comprising a miscible blend of cis-1,4 polybutadiene and solution-polymerized styrene-butadiene rubber.

2. The pneumatic tire of claim 1, wherein said vulcanizable rubber composition further comprises from 1 to 30 phr of a filler selected from carbon black, starch/plasticizer composite, and crosslinked particulate polymer gel.

3. The pneumatic tire of claim 1, wherein said process oil comprises a low PCA process oil having a polycyclic aromatic content of less than 3 percent by weight as determined by the IP346 method, said low PCA oil selected from mild extraction solvates (MES), treated distillate aromatic extracts (TDAE), or heavy napthenic oils.

4. The pneumatic tire of claim 3, wherein said low PCA oil comprises a mild extraction solvates (MES).

5. The pneumatic tire of claim 4, wherein said low PCA oil comprises treated distillate aromatic extracts (TDAE).

6. The pneumatic tire of claim 2, wherein said filler comprises a starch/plasticizer composite.

7. The pneumatic tire of claim 2, wherein said filler comprises a crosslinked particulate polymer gel.

8. The pneumatic tire of claim 1, wherein said sulfur containing organosilicon compound comprises a compound of the formula:

Z-Alk-S$_n$-Alk-Z in which Z is selected from the group consisting of

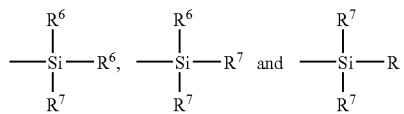

where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

9. The pneumatic tire of claim 1, wherein said sulfur containing organosilicon compound comprises at least one of 3,3'-bis(triethoxysilylpropyl) disulfide or 3,3'-bis(triethoxysilylpropyl) tetrasulfide.

10. The pneumatic tire of claim 1, wherein said sulfur containing organosilicon compound comprises a compound of the formula G-C(=O)—S—CH$_2$CH$_2$CH$_2$SiX$_3$ wherein each X is an independently selected RO— group wherein each R is independently selected from the group consisting of hydrogen, alkyl that may or may not contain unsaturation, alkenyl groups, aryl groups, and aralkyl groups, such moieties other than hydrogen having from 1 to 18 carbon atoms, and G is a monovalent alkyl of from 6 to 8 carbon atoms.

11. The pneumatic tire of claim 10, wherein said sulfur containing organosilicon compound comprises 3-(octanoylthio)-1-propyltriethoxysilane.

12. The pneumatic tire of claim 1, wherein said solution polymerized styrene-butadiene rubber is at least partially silicon coupled.

13. The pneumatic tire of claim 1, wherein said sulfur containing organosilicon compound comprises at least one compound of formula II or III

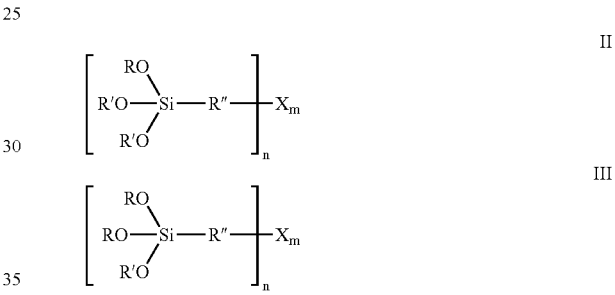

wherein: R is a methyl or ethyl group;
R' is identical or different and is a C$_9$-C$_{30}$ branched or unbranched monovalent alkyl or alkenyl group, aryl group, aralkyl group, branched or unbranched C$_2$-C$_{30}$ alkyl ether group, or branched or unbranched C$_2$-C$_{30}$ alkyl polyether group or R'''$_3$Si, where R''' is C$_1$-C$_{30}$ branched or unbranched alkyl or alkenyl group, aralkyl group or aryl group, R'' is a branched or unbranched, saturated or unsaturated, aliphatic, aromatic or mixed aliphatic/aromatic divalent C$_1$-C$_{30}$ hydrocarbon group;
X is SH where n=1 and m=1, S where n=2 and m=1–10 and mixtures thereof, S(C=O)-R''' where n=1 and m=1 or H where n=1 and m=1;
R'' may mean CH$_2$, CH$_2$CH$_2$, CH$_2$CH$_2$CH$_2$, CH$_2$CH$_2$CH$_2$CH$_2$, CH(CH$_3$), CH$_2$CH(CH$_3$), C(CH$_3$)$_2$, CH(C$_2$H$_5$), CH$_2$CH$_2$CH(CH$_3$), CH$_2$CH(CH$_3$)CH$_2$ or

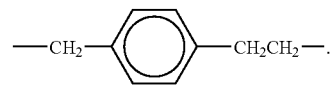

14. The pneumatic tire of claim 13, wherein said sulfur containing organosilicon compound comprise a compound of formula II wherein R is ethyl, R' is C$_{12}$-C$_{14}$ alkyl, R'' is CH$_2$CH$_2$CH$_2$, X is SH, n is 1 and m is 1.

* * * * *